Dec. 13, 1966 M. CAESAR 3,290,975

METHOD OF RE-REGISTRY OF NEGATIVES AND THE LIKE

Filed April 5, 1965 2 Sheets-Sheet 1

INVENTOR
MICHAEL CAESAR
BY Edward Thomas
ATTORNEY

METHOD OF RE-REGISTRY OF NEGATIVES AND THE LIKE
Filed April 5, 1965
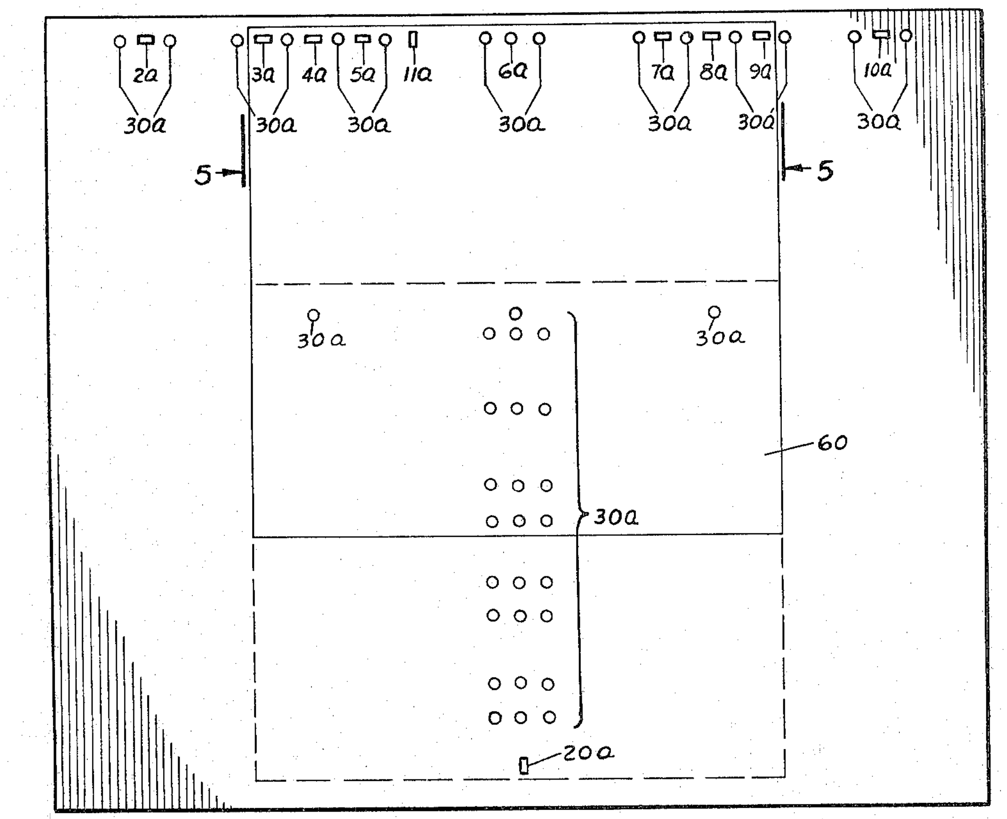
FIG. 4
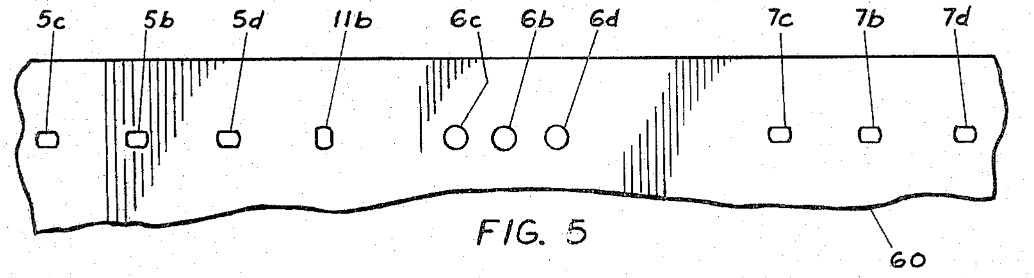
FIG. 5
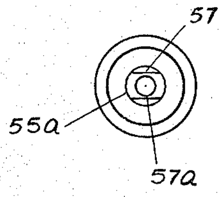
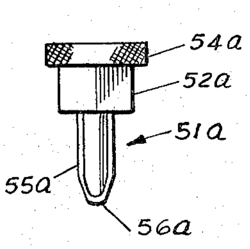
FIG. 7 FIG. 6
INVENTOR
MICHAEL CAESAR
BY Edward V. Connors
ATTORNEY

United States Patent Office 3,290,975

Patented Dec. 13, 1966

3,290,975

METHOD OF RE-REGISTRY OF NEGATIVES AND THE LIKE

Michael Caesar, Forest Hills Gardens, N.Y., assignor to Berkey Photo, Inc., New York, N.Y.

Filed Apr. 5, 1965, Ser. No. 445,631

2 Claims. (Cl. 83—33)

This invention relates to the graphic arts field and more particularly to a method of and apparatus for re-registering sheets such as separation negatives used in the making of colored maps, pictures, or the like.

In multicolor reproduction work as in the production of color maps, pictures or the like, a plurality of sheets are used. These sheets may be negatives, positives, matrixes, or the like, all of which are here termed "negatives." In colored map making, the reproduction process may require the use o ften or more separation negatives in order to provide the desired number of colors on the finished product. The several negatives may be used in various processes to apply colors to the maps.

In order to optically align the negatives, registry marks are generally provided outwardly of the area to be reproduced. Inasmuch as optical alignment is tedious and time-consuming it is customary to punch registry holes along one or more of the edges of the negatives. In high quality reproduction work the registry of the negatives must be within two ten thousandths of an inch. It is thus apparent that the registry holes must be accurately positioned and of a close tolerance in size.

Because of required changes such as in the location of roads in map making, it may be necessary to replace one or more of the negatives. In the registering of substitute negatives it has been proposed to return the old negative in position under a punch, after having removed the male die therefrom, and to align the negative over the opening of the die by passing a rod therethrough. The male die of the punch then is replaced. The substitute negative is placed over the old negative with the optical registry markings in alignment and the registry hole is punched in the substitute negative through the registry hole of the old negative. In many cases the alignment of the registry hole of the old negative is slightly off so that its registry hole is enlarged. Further, the manipulations of the rod in the punch die opening may result in the dulling of the die sharp edge and so prevent the making of clearly defined registry openings.

The present invention aims to overcome the difficulties and advantages of prior devices for the re-registry of punch holes by providing a method and apparatus which utilizes separate registry holes in which registry pins may be conveniently fitted to accurately re-register the negatives.

In accordance with the invention this is accomplished by providing an easel fitted with at least one punch having a flush mounted die opening. Flush mounted bushing means are provided spaced from the punch opening at a convenient location so that registry pins may be inserted through the negative to re-register the negative in exact position.

Other objects and advantages of the invention will be apparent from the following description and from the accompanying drawings which show, by way of example, an embodiment of the invention.

FIGURE 4 is a plan view of the easel illustrating a typical layout of the openings for the punch and bushing members on the easel. A negative is outlined in full lines in the top portion of the easel. The position of the negative when moved to the bottom of the easel is indicated in dashed lines.

FIGURE 5 is a fragmentary enlarged portion of the negative shown in FIGURE 4 taken approximately between lines 5—5.

FIGURE 6 is a side view of another pin member.

FIGURE 7 is a bottom view of the pin member shown in FIGURE 6.

Figure 1:
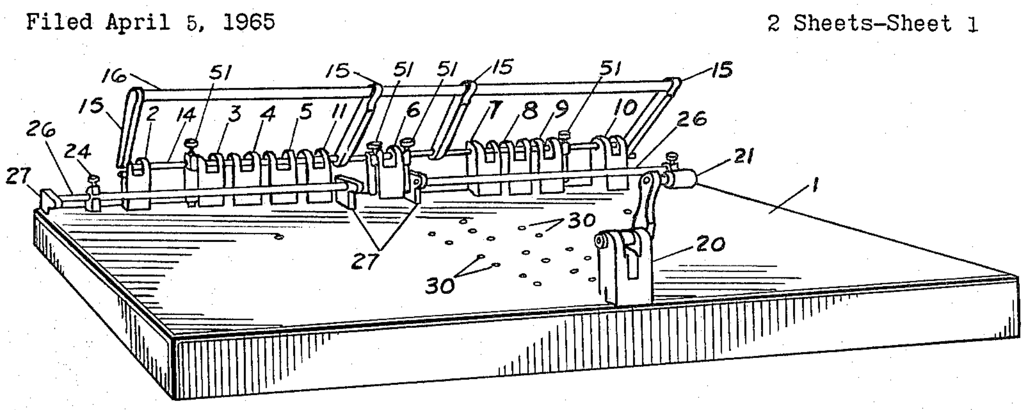
FIGURE 1 is a perspective view of a light easel and punch in accordance with the invention.

Referring to the drawings there is shown in FIGURE 1 a perspective view of apparatus for re-registry of a negative. The apparatus includes an easel 1 having a plurality of gang operated punches 2 through 11 attached to the surface of the easel 1 adjacent the far edge thereof.

The punches 2–11 are gang operated by an operating rod 14 rotated by levers 15 interconnected by a handle 16. Positioned at the near end of the easel is a single punch 20 actuated by a handle 21. Also on the easel 1, if desired, may be positioned side stops 24 slideably positioned on rods 26 and supported in brackets 27.

The easel 1 is preferably made of a transparent material so that light may be transmitted therethrough either from an illumination lamp positioned beneath the surface of the easel, or alternatively, the easel 1 may be of the type shown in my copending design patent application titled "Foldable Light Easel" and filed on even date herewith.

Flush mounted on the easel 1 are a plurality of hardened steel bushing members 30. A characteristic layout showing the openings of the bushing members 30 and the punches 2–11 and 20 is shown in FIGURE 4. The openings of the punches are identified as *2a–11a* and *20a* while the openings in the bushings are identified as *30a*. The holes in a punched negative are likewise identified.

It will be noted that some of the punches are shown for making a round hole while others are shown for making a rectangular opening. The rectangular openings are used to provide for slight expansion or contraction of the negative. If desired various arrangements of round and square openings may be used. However, at least the centerline holes should be circular.

The die openings and the bushing openings are of the same size, preferably about one quarter of an inch in diameter, while the die openings are preferably rectangular in shape of a size of about three eighths by three sixteenths of an inch.

The punch 11 located at one side of the centerline is to provide a positioning mark if desired to assure that the negative will be placed right side up in the assembly. The rectangular shape of its die opening *11a* is located at right angles with respect to the positions of the other rectangular openings. Likewise the rectangular die opening *20a* located at the lower end of FIGURE 4 for the punch 20 is positioned with its longer axis in alignment with the center line so as to provide for slight contraction or expansion of the negative. All the punches are located with their die openings flush with the easel surface.

Figure 2:
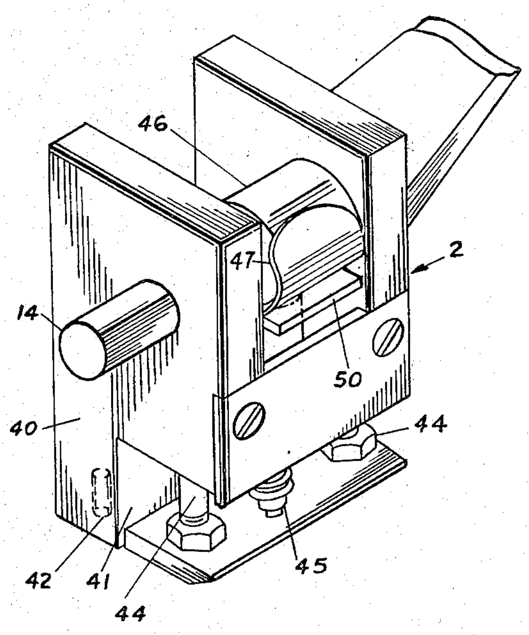
FIGURE 2 is an enlarged view of one of the punches shown in FIGURE 1.

The punches may be of conventional construction. A typical punch 2 is shown at an enlarged scale in FIGURE 2 and includes a frame 40 providing a stop surface 41. The punch 2 may be secured to the surface of the easel by screws engaging threaded apertures 42. Reciprocally mounted within the frame 40 are negative holding members 44 which first contact the negative as the handle 16 is operated. A punch or die member 45 is located between the negative holding members 44.

The operating rod 14 extends through a cam member 46. A soft metal member 47 is positioned between the stainless steel surfaces of the cam 47 and the die member 45. The upper end of the die member 45 is spaced from its cam member 46 so that the punch is normally non-operative until a punch key or key spacer 50 is inserted into the space therebetween. Any other conventional means may be used to render the punch operative or in-operative.

Figure 3:
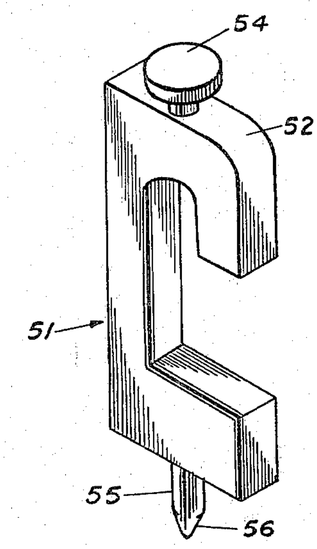
FIGURE 3 is an enlarged view of a pin member as shown in FIGURE 1.

A pin assembly 51 is shown in FIGURE 3 and includes a body 52 of generally hook like shape suitable to be held in position over the operating rod 14. A handle 54 may be placed at the top of the frame. On the lower end of the pin assembly 51 is a pin 55 having a blunt point 56.

Another pin assembly *51a* is shown in FIGURES 6 and 7. This pin member includes a body portion *52a*, a knurled top *54a* and a pin *55a* corresponding in shape and size to the pin 55 of FIGURE 3 and provided with a blunt point *56a*. As may be seen in FIGURE 7 the pin *55a* is of circular shape with flattened sides *57a*. Pin 55 is of the same size and shape. The circular portions 55 and *57a* may be one-quarter of an inch in diameter while the diameter across the flattened sides 57 and *57a* is three sixteenths of an inch. All of the pins 55 and *55a* fit all of the openings.

In using the apparatus in accordance with the invention a negative 60 is placed in position on the easel 1 with its upper edge banked or stopped against the stop or abutment surfaces 41 of the punches 2–11. The negative 60 is centered in position and the punches are activated corresponding to the number of holes desired. The negative 60 is secured in position as by taping or otherwise and the holes are punched. In punching the original negative the number of holes made is as few as possible consistent with good registration. For example, in a section of the negative 60 as shown in FIGURE 5 the only holes punched may be center hole *6b*, positioning hole *11b*, and rectangular holes *5b* and *7b*. The next negative is placed on top of the negative 60, the optical markings placed in alignment and similar holes are punched. This operation is continued until the desired number of negatives have been punched.

If at a later time substitute negatives are to be made for one or more of the original negatives, it is necessary that one of the original negatives first be placed on the easel with its registry hole in proper position under the punch. To accomplish this operation the original negative is placed in position with its registry holes *5b*, *6b* and *7b* located over bushing openings *30a* located to the right of punch openings *5a*, *6a* and *7a*, and the pin assemblies 51 placed in position with their pins 55 extending through the registry holes of the negative. The punch 11 is rendered inoperative. The handle 16 is operated so as to punch holes *5c*, *6c*, and *7c*. If desired additional re-registry holes may be provided on the opposite side of the registry holes *5c*, *6c* and *7c*. In this event the holes *5b*, *6b* and *7b* are positioned over the bushing openings *30a* located to the left of the punch openings *5a*, *6a* and *7a*. The pin assemblies 51 are placed in position and holes *5d*, *6d*, and *7d* are punched. The negative is again shifted so that the holes *5c*, *6c* and *7c* are over the bushings *30a* to the left of the punch openings *5a*, *6a* and *7a*, the pin assemblies 51 inserted in holes *5c*, *6c* and *7c*, and if desired, in holes *5d*, *6d*, and *7d*. The negative is then in proper registry.

At first thought it would appear more logical to punch the alignment holes *5c*, *5d*, *6c*, *6d*, *7c* and *7d* simultaneously with the registry holes *5b*, *6b* and *7b*. However it has been found that such an operation provides an excessive number of holes along the edge of the negative rendering the use of the negative a very confusing operation. This is particularly the case if unexposed negatives are to be registered. The side stops 24 may be used if desired to position unexposed negatives in position for the punching operation.

In the event it is desired to punch a hole *20a* in the opposite side of a negative from the registry holes *2a*–*10a*, the negative must be first registered and punched at the upper end of the easel. The negative is then shifted to the lower edge of the easel and registered. In this case the shorter pin assembly *51a* is used in the bushings *30a* to maintain the negative in position.

It will thus be seen that a novel method and apparatus for re-registry of negatives and the like has been provided.

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. The method of punching a second negative in registry with a first negative having at least one prepunched hole therein without causing possible enlargement of said prepunched hole, using an easel supporting at least a punch having a die opening and cooperating bushing and members, the bushing member having an opening of the same size as said die opening and spaced a predetermined distance therefrom, the method comprising the steps of placing the prepunched hole of the first negative over the opening of the bushing member, then inserting the pin member through said prepunched hole into the bushing opening, thereafter punching at least one new hole in said first negative, then shifting the first negative so that the new hole is positioned over the opening in the bushing member, inserting the pin member through said new hole thereby aligning the first negative with its said prepunched hole over said die opening, securing said prepunched negative in position, placing said second negative over said prepunched negative, and punching a hole in said second negative through said prepunched hole in said first negative.

2. The method in accordance with claim 1 in which a plurality of gang-operated linearly-spaced punches and a plurality of bushing members with cooperating pins are provided for the easel so that a plurality of linearly positioned holes are punched in the second negative.

References Cited by the Examiner

UNITED STATES PATENTS

| | | | |
|---|---|---|---|
| 191,311 | 5/1877 | Choate | 83—467 |
| 926,261 | 6/1909 | Krag | 83—618 X |
| 1,417,749 | 5/1922 | Koppe | 83—468 X |
| 2,265,726 | 12/1941 | Greenberg | 83—36 X |
| 3,091,318 | 5/1963 | Carboni | 83—573 X |
| 3,152,505 | 10/1964 | Alldis | 83—468 |
| 3,215,016 | 11/1965 | Olson | 83—467 |

ANDREW R. JUHASZ, *Primary Examiner.*